Figure 1:
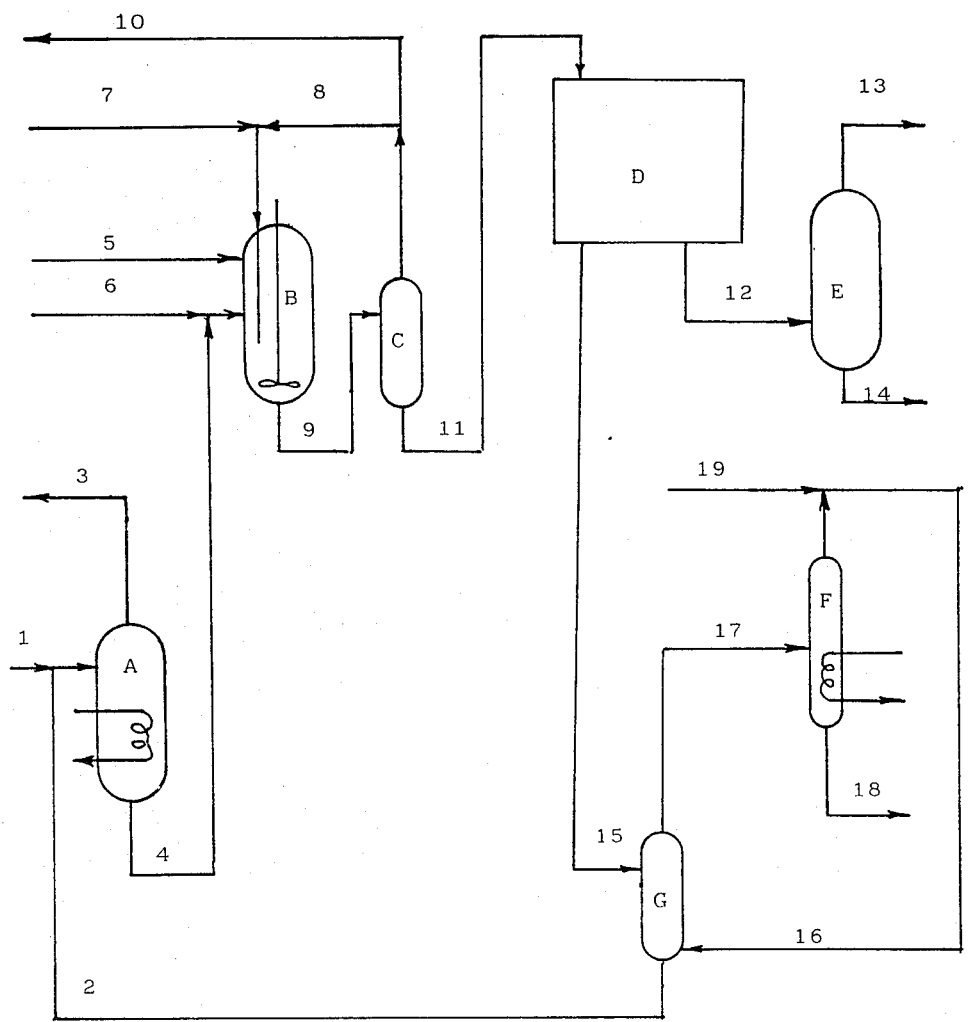

United States Patent [19]

Paparatto et al.

[11] Patent Number: 4,857,295

[45] Date of Patent: Aug. 15, 1989

[54] PROCESS FOR THE MANUFACTURE OF IODINE

[75] Inventors: Giuseppe Paparatto; Guglielmo Gregorio, both of Milan, Italy

[73] Assignee: Montedipe S.p.A., Milan, Italy

[21] Appl. No.: 219,818

[22] Filed: Jul. 15, 1988

Related U.S. Application Data

[63] Continuation of Ser. No. 917,953, Oct. 14, 1986, abandoned.

[30] Foreign Application Priority Data

Oct. 15, 1985 [IT] Italy ................................ 22497 A/85

[51] Int. Cl.$^4$ ................................................ C01B 7/14
[52] U.S. Cl. ...................................... 423/502; 423/500
[58] Field of Search ........................ 423/502; 568/739

[56] References Cited

U.S. PATENT DOCUMENTS

| | | | |
|---|---|---|---|
| 2,874,031 | 2/1959 | Greene et al. | 423/502 |
| 2,892,686 | 6/1959 | Greene et al. | 423/502 |
| 2,892,687 | 6/1959 | Deahl et al. | 423/502 |
| 3,006,731 | 10/1961 | Magovern et al. | 423/502 |
| 3,627,471 | 12/1971 | Botton et al. | 423/502 |
| 3,760,067 | 9/1973 | Ingwatso | 423/502 |
| 3,975,434 | 8/1976 | Klabunde | 204/81 |
| 4,107,271 | 8/1978 | Atsukawa et al. | 423/506 |
| 4,107,280 | 8/1978 | Rohrmann | 423/502 |
| 4,487,752 | 12/1984 | Shimizu et al. | 423/507 |
| 4,537,835 | 8/1985 | Rohrmann et al. | 423/488 |

FOREIGN PATENT DOCUMENTS

| | | | |
|---|---|---|---|
| 815975 | 6/1969 | Canada | 423/502 |
| 0101282 | 2/1984 | European Pat. Off. | |
| 0106934 | 5/1984 | European Pat. Off. | 423/502 |
| 124190 | 10/1978 | Japan | 423/502 |
| 6500976 | 1/1965 | Netherlands | 423/502 |
| 6409278 | 2/1966 | Netherlands | 423/502 |
| 6711302 | 2/1969 | Netherlands | 423/502 |
| 820142 | 9/1959 | United Kingdom | 423/502 |
| 824471 | 12/1959 | United Kingdom | 423/502 |
| 843599 | 8/1960 | United Kingdom | 423/502 |
| 946830 | 1/1964 | United Kingdom | 423/502 |

Primary Examiner—H. M. S. Sneed
Assistant Examiner—Helane Myers
Attorney, Agent, or Firm—Stevens, Davis, Miller & Mosher

[57] ABSTRACT

A process for the manufacture of iodine, in the presence of a catalyst selected from copper, gold, a transition metal or a compound thereof, characterized in that an aqueous solution of an alkali metal iodide is oxidized—with oxygen, air or other oxygen containing gas—in the presence of carbon dioxide (an alkali metal carbonate and/or bicarbonate being thus formed).

Iodine is generally obtained by oxidation of alkali metal iodides coming from a natural source, such as those contained in Chilean nitrates or in other salt deposits (sea-water included), or having an industrial origin; in the latter case the alkali metal iodide is generally the effluent of different processes which contemplate iodine recovery for economic reasons.

16 Claims, 1 Drawing Sheet

PROCESS FOR THE MANUFACTURE OF IODINE

This application is a continuation of application Ser. No. 917,953, filed Oct. 14, 1986 now abandoned.

The oxidation of an alkali metal iodide, according to the known techniques, can be carried out in neutral aqueous solutions, by means of an addition of chlorine, or in a highly acid solution, by means of an injection of oxygen; in both cases the salts, which are obtained as by-products, for instance sodium chloride or sodium sulphate in aqueous solution, have in practice no economic value. Some methods, which were followed alternatively until now, are not advisable owing to the excessive consumption of electric power (see U.S. Pat. No. 3,975,439) or owing to the presence of ammonia which slows up the reaction in a remarkable way and causes considerable environmental and operative problems (see Japanese patent publication No. 78/73489 and European Pat. No. 101282).

The present inventors have now found that the drawbacks hereinbefore encountered can be easily overcome by avoiding the formation of undesirable by-products, if use is made of a particular oxidation of the iodide. Obviously this process can also be applied, in an equivalent way, sodium iodide as well as to one or more iodides of alkali metals or of alkaline-earth metals, such as for instance the iodides that are present in the iodinated mother liquors coming from the common salt-works, as well as in iodine containing spring waters.

DISCLOSURE OF THE INVENTION

In its widest form, the invention relates to a process for the manufacture of iodine, in the presence of a catalyst selected from copper, gold, a transition metal or a compound thereof, characterized in that an aqueous solution of an alkali metal iodide is oxidized—with oxygen, air or other oxygen containing gas—in the presence of carbon dioxide (an alkali metal carbonate and-/or bicarbonate being thus formed) and, optionally, also in the presence of an extraction solvent, whereby iodine is continuously extracted from the reaction medium. Preferably the catalyst should be selected from the group consisting of copper, palladium, rutenium, and compounds thereof.

$NaHCO_3$, by the way, can be employed very usefully in the hydrolysis of iodobenzene to phenol, as described in Italian patent application No. 20991 A/85.

Excellent results are obtained by using benzene, toluene or iodobenzene as extracting solvent. The of solvent depends on the starting amount of iodide and on the concentration thereof; (solvent):(Na I) molar ratios between 0.1 and 20 are generally advisable. The process allows one to recover a valuable compound, i.e. iodine, by making use of an agent having a very low commercial value such as carbon dioxide, thereby obtaining, at the same time, valuable by-products which do not give rise to any environmental or separation problems.

As catalytic transition metal, use may be made, for instance, of a metal selected from the group consisting of V, Mn, Fe, Co, Cr, Mo, W, Pd, Ru and so on. Copper, Pd and Ru are preferred, as they increase the oxidation rate more. The compounds of these metals can be of different nature; in the case of copper, for instance, use can be made of cuprous iodide, cuprous chloride, cupric chloride, cuprous oxide and generally, of the copper compounds cited in European Pat. No. 101,282.

Obviously said transition metals can be used alone or as a mixture, according to different ratios; generally metal/iodide molar ratios from 0.001 to 1 lead to satisfactory results. The degree of dilution may vary within wide ranges as well; generally the amount of water should range from 50 to 100 g per 100 g of sodium iodide.

As to the oxidizing gas, oxygen, air and enriched with $O_2$ proved to be quite satisfactory, especially when the total pressure of the system was higher than 5 bar (generally 10–100 bar). The amount of oxygen should correspond to the stoichiometric requirement of the iodide ion and the amount of carbon dioxide, should correspond at least to the stoichiometric amount of sodium bicarbonate.

A too high temperature needs uselessly excessive pressures; it is therefore advisable to keep the temperature below 120° C. (generally 20°–100° C.). Within these ranges, a temperature increase can boost the reaction rate. $CO_2$ keeps the reaction pH at the best level, hindering the disproportionation reactions of iodine to iodates and iodides. Among the different metals that can be used for the apparatuses, titanium and tantalum are advisable.

The drawing attached hereto illustrate some details of the invention, without absolutely limiting, however, the scope thereof.

Following FIG. 1, an aqueous solution of sodium iodide (1), together with a recycle solution (2), is fed to evaporator A from which steam (3) is withdrawn and wherein the iodide concentration is raised up to the desired level. The concentrated stream (4) enters reactor B, supplied with a rotating stirrer, together with stream (5), containing the catalyst in the form of an aqueous solution or suspension and, optionally, with a solvent stream (6); a mixture of carbon dioxide with oxygen, air, enriched air or other oxygen-containing gas (7) is injected into the liquid of reactor B together with recycle stream (8). The raw effluent (9), containing free iodine, residual iodide, water, bicarbonate and catalyst, is then transferred to degassing vessel C, where the excess of $CO_2$, the excess of oxygen and, possibly, some nitrogen and/or other inert gases are recycled or released (through line 10). The degassed mixture (11) is filtered in D and the filter cake is thoroughly washed with benzene, in order to recover all the residual traces of iodine; sodium bi-carbonate (12) can be transferred to a storage system or de-carbonated in apparatus E which supplies a $CO_2$ stream (13) and pure sodium carbonate (14). The filtered liquid (15) flows to an extraction zone G where iodine is extracted in countercurrent to a recycle stream of benzene (16) and the extract (17) is evaporated within apparatus F, in order to recover a very concentrated solution of iodine in benzene (18); a small benzene make up (19) should obviously be provided for.

The following examples illustrate the invention, without limiting however in any way the scope thereof.

EXAMPLE 1

150 g of NaI, 200 g of deionized water and 1 g of CuI were placed into a thermally stabilized titanium autoclave, equipped with a rotary stirrer (1000 rpm); the temperature was brought up to 80° C. and then carbon dioxide was loaded, thereby increasing the pressure up to 70 bar. Lastly pure oxygen was loaded, so that the pressure reached 100 bar. The temperature was kept at 80° C. for 4 hours; after having cooled and vented the residual gases, the raw product of the reaction was unloaded and analysed. The presence of 52.2 g of elemental iodine ($I_2$) was ascertained, corresponding to a 41.1% yield with respect to the iodide.

EXAMPLE 2

Example 1 was repeated, adding 0.5 moles of iodobenzene per mole of Na I; a 43.6% yield was obtained.

What is claimed is:

1. A process for the manufacture of iodine in the presence of a catalyst selected from the group consisting of copper, gold, and a transition metal, or a compound thereof, consisting essentially of oxidizing an aqueous solution of an alkali metal iodide with oxygen, air, or other oxygen-containing gas in the presence of carbon dioxide, an alkali metal carbonate and/or bicarbonate being thus formed.

2. A process according to claim 1, wherein the catalyst is selected from the group consisting of copper, palladium, ruthenium and compounds thereof.

3. A process according to claim 1, wherein the extracting solvent is iodobenzene, the (iodobenzene):(alkali metal iodide) molar ratio being from 0.1 to 20.

4. A process according to claim 1, wherein the transition metal is copper, the (copper):(alkali metal iodide) molar ratio being from 0.001 to 1.

5. A process according to claim 1, wherein the amount of water in the solution ranges from 50 to 1000 g and preferably from 100 to 1000 g per 100 g of alkali metal iodide.

6. A process according to claim 1, wherein the total pressure is higher than 5 bar.

7. A process according to claim 1, wherein the temperature is equal to or lower than 120° C.

8. A process according to claim 1, wherein the oxidation is carried out in a reactor having titanium or tantalum walls, equipped with a rotary stirrer.

9. A process according to claim 1, wherein said aqueous solution substantially consists of the aqueous residue coming from a particular synthesis zone where phenol is manufactured by means of a hydrolysis of mono-iodobenzene.

10. A process according to claim 3, wherein the alkali metal iodide is sodium iodide and the total (iodobenzene:sodium iodide) molar ratio is from 0.1 to 20.

11. A process according to claim 1, wherein the total pressure is from 10 to 100 bar.

12. A process according to claim 1, wherein the temperature is from 10° to 100° C.

13. A process as defined in claim 1, wherein the oxidation is carried out in the presence of an extraction solvent, whereby iodine is continuously extracted from the reaction medium.

14. A process for the recovery of iodine from an aqueous solution of sodium iodide, in the presence of a homogeneous or heterogeneous catalyst containing copper or a compound thereof, characterized in that said solution is oxidized at 20°–100° C. and at 10–100 Bar, in the presence of carbon dioxide according to (copper:sodium iodide) molar ratios of from 0.001 to 1, the amount of water being from 100 to 1000 g per 100 g of sodium iodide.

15. The method of claim 14, wherein the catalyst is supported on an inert carrier.

16. A process as defined in claim 14, wherein the oxidation is carried out in the presence of iodobenzene according to iodobenzene:sodium iodide molar ratios of from 0.1 to 20.

* * * * *